(12) United States Patent
Deonarine

(10) Patent No.: US 7,290,970 B2
(45) Date of Patent: Nov. 6, 2007

(54) MULTI-CHANNEL FLAT VALVE ASSEMBLY FOR USE WITHIN A DUNNAGE OR CARGO AIR BAG, AND APPARATUS AND METHOD FOR INSTALLING SAME

(75) Inventor: Victor I. Deonarine, Schaumburg, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/840,742

(22) Filed: May 7, 2004

(65) Prior Publication Data
US 2005/0249570 A1 Nov. 10, 2005

(51) Int. Cl.
*B60P 7/08* (2006.01)
(52) U.S. Cl. .................. 410/119; 251/149.8
(58) Field of Classification Search .......... 410/119, 410/125; 383/3, 94, 109, 113; 206/522, 206/593; 137/225, 512.1, 512.15; 141/68, 141/314; 428/35.2; 251/149.8
See application file for complete search history.

(56) References Cited

U.S. PATENT DOCUMENTS

| | | | |
|---|---|---|---|
| 3,868,026 A | 2/1975 | Baxter | |
| 4,040,526 A | 8/1977 | Baxter et al. | |
| 4,102,364 A | 7/1978 | Leslie et al. | |
| 4,146,069 A | 3/1979 | Angarola et al. | |
| 4,146,070 A | 3/1979 | Angarola et al. | |
| 4,850,912 A * | 7/1989 | Koyanagi | |
| 5,228,468 A | 7/1993 | Kapadia | |
| 5,272,856 A | 12/1993 | Pharo | |
| 5,308,163 A | 5/1994 | Abe | |
| 5,427,830 A | 6/1995 | Pharo | |
| 5,447,235 A | 9/1995 | Pharo | |
| 5,588,532 A | 12/1996 | Pharo | |
| 5,711,691 A | 1/1998 | Damask et al. | |
| 5,788,438 A | 8/1998 | Goshorn et al. | |
| 5,908,275 A | 6/1999 | Howlett, Jr. et al. | |
| 6,129,491 A * | 10/2000 | Duursma et al. | 410/119 |
| 6,283,296 B1 | 9/2001 | Newman | |
| 6,464,079 B1 | 10/2002 | Newman | |
| 6,527,488 B2 | 3/2003 | Elze et al. | |
| 6,537,043 B1 | 3/2003 | Chen | |
| 6,571,954 B2 | 6/2003 | Nadler | |
| 2003/0021649 A1 | 1/2003 | Shetty | |
| 2003/0021923 A1* | 1/2003 | Russo | |

* cited by examiner

Primary Examiner—Stephen Gordon
(74) Attorney, Agent, or Firm—Schwartz & Weinrieb

(57) ABSTRACT

A multi-channel flat valve assembly comprises multiple fluid channels which are effectively defined within the multi-channel flat valve assembly by means of laterally or transversely spaced heat-sealed regions. Accordingly, when the dunnage or cargo air bag is inflated, whereby the forces acting upon the oppositely disposed plastic sheets defining or comprising the flat valve assembly would tend to cause separation of the oppositely disposed plastic sheets with respect to each other and cause the flat valve assembly to attain an OPENED state, the disposition or presence of the heat sealed regions defining the multiple fluid channels effectively intercepts the propagation of such forces whereby the flat valve assembly tends to remain in its CLOSED state so as to effectively preserve the INFLATED state of the dunnage or cargo air bag, or considered alternatively, the dunnage or cargo air bag does not undesirably or inadvertently achieve a DEFLATED state.

18 Claims, 8 Drawing Sheets

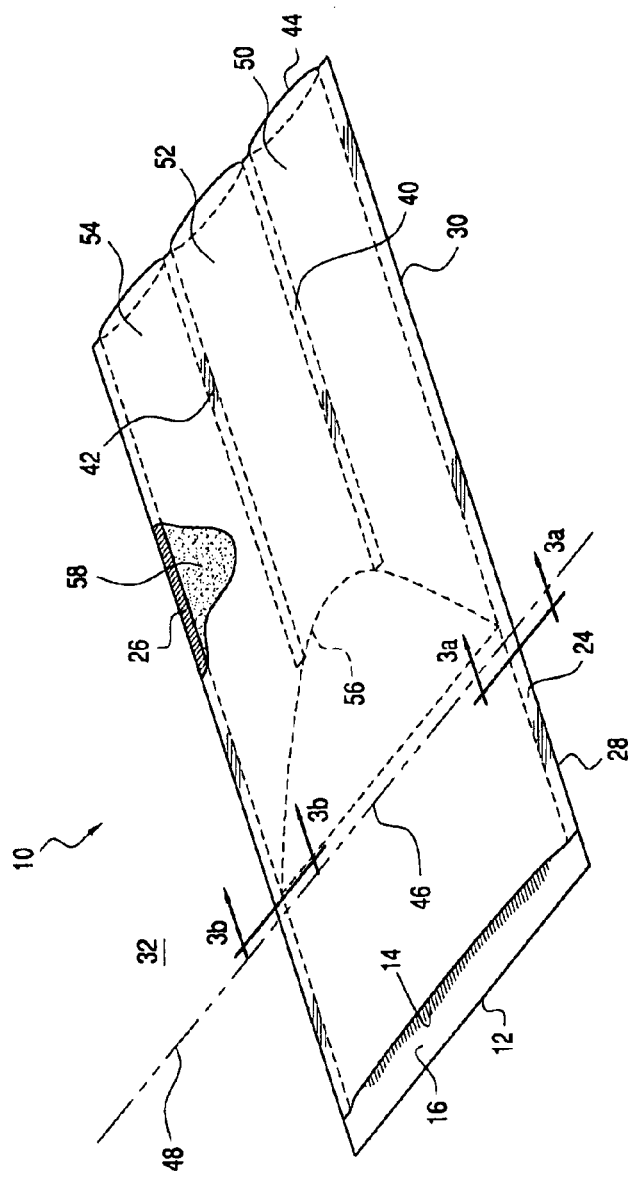
FIG.2
FIG.3a
FIG.3b

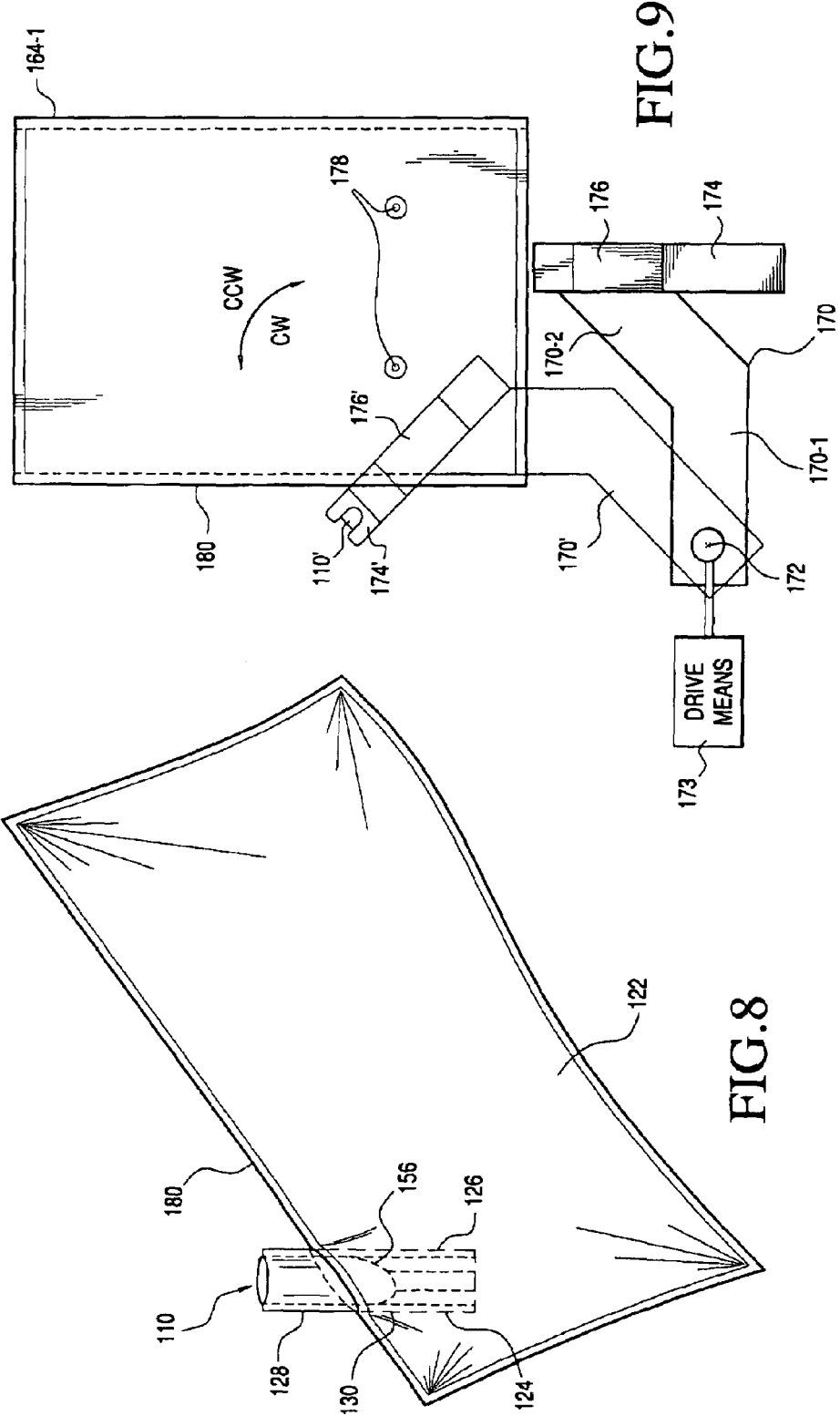

MULTI-CHANNEL FLAT VALVE ASSEMBLY FOR USE WITHIN A DUNNAGE OR CARGO AIR BAG, AND APPARATUS AND METHOD FOR INSTALLING SAME

FIELD OF THE INVENTION

The present invention relates generally to dunnage or cargo air bags, and more particularly to a new and improved multi-channel flat valve assembly for facilitating the inflation of an inflatable bladder disposed interiorly of, or comprising, the dunnage or cargo air bag for use in connection with the securing or bracing of cargo within the holds of different transportation facilities, such as, for example, railroad cars, airplanes, ships, truck trailers, or the like, wherein the width dimension of the multi-channel flat valve assembly can be enhanced or enlarged such that the inflation of the dunnage or cargo air bag can be rapidly accomplished, while the length dimension of the multi-channel flat valve assembly can be maintained relatively small so as not to adversely affect the size or filling capacity of the dunnage or cargo air bag, wherein the length dimension of the multi-channel flat valve assembly can be maintained relatively small such that the downstream or inner end portion of the multi-channel flat valve assembly does not become entangled or folded over upon itself whereby the proper and complete filling of the dunnage or cargo air bag with pressurized or compressed air can in fact be achieved so as to subsequently secure or brace cargo loads in a desirably stabilized manner, and wherein further, the length dimension of the multi-channel flat valve assembly can be maintained relatively small such that the valve assembly can be optimally located in an upper corner region of the dunnage or cargo air bag so as to effectively prevent any distortion or folding over of the corner region of the dunnage or cargo air bag whereby, again, the proper and complete inflation of the dunnage or cargo air bag can be facilitated and ensured so as to, in turn, ensure the secure bracing of the cargo loads in a desirably stabilized manner.

BACKGROUND OF THE INVENTION

Dunnage or cargo air bags are used within the cargo shipment or transportation industry as a means for readily and easily securing or bracing cargo within the holds of different transportation facilities, such as, for example, railroad cars, ships, airplanes, truck trailers, and the like. Such dunnage or cargo air bags conventionally comprise an inflatable bladder which is enclosed within an outer bag or envelope which is conventionally fabricated from a plurality of paper plies or other materials. The dunnage or cargo air bags are conventionally of such construction and size as to readily enable the same to be inserted into voids or spaces defined between spaced cargo loads, or between a particular cargo load and a side or end wall of the cargo container or hold, whereupon inflation of the dunnage or cargo air bag, the dunnage or cargo air bag will expand so as to thereby fixedly engage the adjacent cargo loads, or the cargo load and the container wall, so as to secure the cargo loads against undesirable movement during transit obviously, in order to in fact achieve the inflation of the dunnage or cargo air bags to a predetermined pressurized level by permitting pressurized or compressed air to be conducted into the interior portion of the inflatable bladder, or alternatively, in order to in fact permit the pressurized air or compressed air, already disposed within the interior portion of the inflatable bladder, to be exhausted out from the interior portion of the inflatable bladder so as to permit deflation of the same, such dunnage or cargo air bags are conventionally provided with a suitable inflation valve assembly.

Various different embodiments or structures of dunnage or cargo air bags, and inflation valve assemblies, for use in connection with the inflatable bladders of such dunnage or cargo air bags, or for use in connection with similar packaging components, are disclosed, for example, within U.S. Pat. No. 6,527,488 which issued to Elze et al. on Mar. 4, 2003, U.S. Pat. No. 5,908,275 which issued to Howlett, Jr. et al. on Jun. 1, 1999, U.S. Pat. No. 5,788,438 which issued to Goshorn et al. on Aug. 4, 1998, U.S. Pat. No. 4,146,070 which issued to Angarola et al. on Mar. 27, 1979, U.S. Pat. No. 4,146,069 which issued to Angarola et al. on Mar. 27, 1979, U.S. Pat. No. 4,102,364 which issued to Leslie et al. on Jul. 25, 1978, U.S. Pat. No. 4,040,526 which issued to Baxter et al. on Aug. 9, 1977, U.S. Pat. No. 3,868,026 which issued to Baxter on Feb. 25, 1975, as well as within U.S. patent application Publication 2003/0021649 which was published for Shetty on Jan. 30, 2003.

As can be readily appreciated from some of the fore-going patent publications, various inflation valve assemblies, which have apparently been adapted for use in conjunction with dunnage or cargo air bag assemblies for inflating and deflating the same, are generally disclosed within, for example, the aforenoted patents which issued to Baxter et al. and Baxter, while the details of other inflation valve assemblies, which have likewise been particularly adapted for use in conjunction with dunnage or cargo air bag assemblies, are disclosed within the aforenoted patents which issued to Leslie et al. and Angarola et al. More particularly, as disclosed, for example, within any one of the aforenoted patents which issued to Leslie et al. and Angarola et al., all of the valve assemblies have upstanding valve stem members which are normally disposed or biased toward a sealed arrangement with respect to a valve seat member. Furthermore, in order to, for example, inflate the dunnage or cargo air bag, a suitable compressed air gun, or similar implement, is adapted to be mated with, or seated upon, the valve stem housing such that, for example, a nozzle portion or member of the gun or implement can in fact mate with or be seated upon the valve stem housing. In this manner, the gun or implement can effectively force or cause the upstanding valve stem member to be moved away from its valve seat. It is noted, however, in connection with the detailed description of such valve structures, that while such valve structures have been characterized as comprising "flat valve" structures in that they effectively permit the dunnage or cargo air bags, when disposed in their deflated states or conditions, to lie substantially or generally flat, such valve structures per se, in view of the integral incorporation or disposition of the upstanding valve stem and housing components within the dunnage or cargo air bags, nevertheless do not comprise true flat valve structures in view of the fact that true flat valve structures normally do not have substantial or considerable height profiles or dimensions.

It is noted further, however, that true flat valve structures are in fact well-known within the fluid handling industry, and that various different embodiments or structures of true flat valves, for use within, or in connection with, inflatable structures or packages, are disclosed, for example, within U.S. Pat. No. 5,711,691 which issued to Damask et al. on Jan. 27, 1998, U.S. Pat. No. 5,588,532 which issued to Pharo on Dec. 31, 1996, U.S. Pat. No. 5,308,163 which issued to Abe on May 3, 1994, and U.S. Pat. No. 5,228,468 which issued to Kapadia on Jul. 20, 1993. It is noted still further that the flat valve structures as disclosed, for example, within the Damask et al., Pharo, and Abe patents are relatively simplistic in that they all comprise, in effect, a pair of plastic sheets which are disposed atop each other and which are heat-sealed together along laterally separated, longitudinally extending heat-sealed side or edge regions. Accordingly, a single fluid or air channel, through which compressed or pressurized air can flow in connection with the inflation or deflation of the bag, container, or structure, is defined between the longitudinally extending heat-sealed regions. Furthermore, it is well-known, in accordance with conventional fluid flow or fluid handling techniques and principles, that in order to provide a particular fluid flow, which is flowing or being conducted through a particular conduit, channel, or duct, with sufficient pressure and velocity properties or parameters, the length and width or diametrical dimensions of the particular channel, duct, or conduit must be characterized, or related to each other, by means of a predetermined ratio. Accordingly, if it is desired, for example, to increase the width or diametrical dimension of the particular channel, duct, or conduit in order to, for example, increase the volume of fluid flow through the particular conduit, channel, or duct such that the inflation of the inflatable package, or dunnage or cargo air bag, can be achieved more rapidly or in a substantially shorter amount of time, then the length dimension of the particular channel, duct, or conduit must be correspondingly increased so as to maintain the aforenoted predetermined ratio defined between the length and width or diametrical dimensions characteristic of the particular fluid conduit, channel, or duct whereby the desired pressure and velocity properties or parameters of the fluid flow, which is being conducted or flowing through the particular channel, conduit, or duct, can in fact be maintained or preserved.

Still further, while in some instances, providing the particular fluid channel, duct, or conduit with the correspondingly increased length dimension would normally not present any critical or significant problems, when the flat valve structures, having such increased length dimensions, are utilized within inflatable dunnage or cargo air bags, the disposition or incorporation of such relatively longer flat valve structures within the inflatable dunnage or cargo air bags limits the inflation capacity of the inflatable dunnage or cargo air bag. In addition, it is to be particularly appreciated that in order to ensure the fact that the flat valve structures remain closed, after inflation of the dunnage or cargo air bags has been performed, such that the dunnage or cargo air bags will not undergo undesirable or inadvertent deflation so as not to adversely affect the securing or bracing of the cargo loads, the flat valve structures necessarily have a relatively extensive length dimension whereby the downstream end portions of the flat valve structures, that is, those distal end portions of such flat valve structures which are disposed internally within the inflatable dunnage or cargo air bag, will have effectively become entangled or twisted with respect to themselves, or folded over upon themselves, such that the flat valve structures are effectively closed off or self-sealed.

This phenomenon, however, presents operational problems in that as a result of such entanglement, twisting, or folding over of the flat valve structures, the flat valve structures may prematurely prevent the effective inflation of the cargo or dunnage air bags, or alternatively, such undesirable structural features characteristic of the flat valve structures may render the complete inflation of the dunnage or cargo air bags difficult and time-consuming to achieve. Still yet further, when such flat valve structures are necessarily relatively extensive in length, the disposition or incorporation of such relatively long flat valve structures into an inflatable dunnage or cargo air bag also limits the region or space, defined within the inflatable dunnage or cargo bag, into which the flat valve structure can actually be incorporated. In other words, due to the relatively enlarged size of such flat valve structures, they cannot be readily disposed within a corner region of the inflatable dunnage or cargo air bag, but, to the contrary, must be disposed at a location which is somewhat remote from the corner region of the inflatable dunnage or cargo air bag. Accordingly, it has proven somewhat difficult or problematic to achieve the rapid and complete inflation of the inflatable dunnage or cargo air bag because operator personnel cannot readily support the corner region of the inflatable dunnage or cargo air bag while at the same time support or manipulate the air nozzle and flat valve assembly during the inflation of the inflatable dunnage or cargo air bag.

A need therefore exists in the art for a new and improved multi-channel flat valve assembly for facilitating the inflation of an inflatable bladder disposed interiorly of, or comprising, the dunnage or cargo air bag for use in connection with the securing or bracing of cargo within the holds of different transportation facilities, such as, for example, railroad cars, airplanes, ships, truck trailers, and the like, wherein the width dimension of the multi-channel flat valve assembly can be enhanced or enlarged such that the inflation of the dunnage or cargo air bag can be rapidly accomplished, while the length dimension of the multi-channel flat valve assembly can be maintained relatively small so as not to adversely affect the size or filling capacity of the dunnage or cargo air bag, wherein the length dimension of the multi-channel flat valve assembly can be maintained relatively small such that the downstream or inner end portion of the multi-channel flat valve assembly does not become entangled, twisted, or folded over upon itself whereby the proper and complete filling of the dunnage or cargo air bag with pressurized or compressed air can in fact be achieved so as to subsequently secure or brace cargo loads in a desirably stabilized manner, and wherein further, the length dimension of the multi-channel flat valve assembly can be maintained relatively small such that the valve assembly can be optimally located within an upper corner region of the dunnage or cargo air bag so as to effectively prevent any distortion or folding over of the corner region of the dunnage or cargo air bag whereby, again, the proper and complete inflation of the dunnage or cargo air bag can be facilitated and ensured so as to, in turn, ensure the secure bracing of the cargo loads in a desirably stabilized manner.

SUMMARY OF THE INVENTION

The foregoing and other objectives are achieved in accordance with the teachings and principles of the present invention through the provision of a new and improved multi-channel flat valve assembly for facilitating the inflation of an inflatable bladder disposed interiorly of, or comprising, the dunnage or cargo air bag for use in connection with the securing or bracing of cargo within the holds of different transportation facilities, such as, for example, railroad cars, airplanes, ships, truck trailers, and the like, wherein the width dimension of the multi-channel flat valve assembly can be enhanced or enlarged such that the inflation of the dunnage or cargo air bag can be rapidly accomplished, while the length dimension of the multi-channel flat valve assembly can be maintained relatively small so as not to adversely affect the size or filling capacity of the dunnage or cargo air bag. In particular, multiple fluid channels are effectively defined within the multi-channel flat valve assembly by means of laterally or transversely spaced heatsealed regions. Accordingly, as will be more fully appreciated hereinafter, when the dunnage or cargo air bag is inflated, whereby the forces acting upon the oppositely disposed plastic sheets defining or comprising the flat-valve assembly would tend to cause separation of the oppositely disposed plastic sheets with respect to each other and cause the flat-valve assembly to attain an OPENED state, the disposition or presence of the heat sealed regions defining the multiple fluid channels effectively intercepts the propagation of such forces whereby the flat valve assembly tends to remain in its CLOSED state so as to effectively preserve the INFLATED state of the dunnage or cargo air bag, or considered alternatively, the dunnage or cargo air bag does not undesirably or inadvertently achieve a DEFLATED state.

Accordingly, as a result of such structure characteristic of the multi-channel flat valve assembly of the present invention, the length dimension of the flat valve assembly can be maintained relatively small such that the downstream or inner end portion of the multi-channel flat valve assembly does not become entangled, twisted, or folded over upon itself, which would otherwise adversely affect the proper and complete filling of the dunnage or cargo air bag with pressurized or compressed air. In addition, the length dimension of the multi-channel flat valve assembly can be maintained relatively small whereby the proper and complete filling or inflation of the dunnage or cargo air bag with pressurized or compressed air can in fact be achieved so as to subsequently secure or brace cargo loads in a desirably stabilized manner, and wherein further, the length dimension of the multi-channel flat valve assembly can be maintained relatively small such that the valve assembly can be optimally located in an upper corner region of the dunnage or cargo air bag so as to effectively prevent any distortion or folding over of the corner region of the dunnage or cargo air bag whereby, again, the proper and complete inflation of the dunnage or cargo air bag can be facilitated and ensured so as to, in turn, ensure the secure bracing of the cargo loads in a desirably stabilized manner. Apparatus and a method for installing the multi-channel flat valve assembly within the inflatable dunnage or cargo air bag is also disclosed.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 2 is a perspective view, similar to that of FIG. 1 but from an opposite point of perspective, showing the new and improved multi-channel flat valve assembly of the present invention as mounted within an inflatable dunnage or cargo airbag wherein the longitudinal axis of the multi-channel flat valve assembly is disposed substantially perpendicular to the side edge portion of the inflatable dunnage or cargo airbag;

FIG. 3a is a cross-sectional view of the new and improved multi-channel flat valve assembly, as disclosed in FIG. 2 and as taken along lines 3a-3a of FIG. 2, wherein one bladed or tapered side edge portion of the multi-channel flat valve assembly is disclosed for the purpose of enhancing the integrity of the heat seal as defined between an intermediate portion of the multi-channel flat valve assembly and the end edge portion of the inflatable bladder member of the inflatable dunnage or cargo air bag within which the multi-channel flat valve assembly is to be fixedly mounted;

FIG. 3b is a cross-sectional view of the new and improved multi-channel flat valve assembly, as disclosed in FIG. 2 and as taken along lines 3b-3b of FIG. 2, wherein one of the bladed or tapered side edge portions of the multi-channel flat valve assembly, as disclosed within FIG. 3a, is disclosed as being operatively cooperative with the internal surfaces of the inflatable bladder member of the inflatable dunnage or cargo air bag so as to in fact facilitate and enhance the integrity of the heat seal as defined between the intermediate portion of the multi-channel flat valve assembly and the end edge portion of the inflatable bladder member of the inflatable dunnage or cargo air bag when the end edge portion of the inflatable bladder member of the inflatable dunnage or cargo air bag is heat-sealed with respect to the intermediate portion of the multi-channel flat valve assembly;

FIG. 8 is a top plan view, similar to that of FIG. 4, showing an inflatable dunnage or cargo air bag within which a new and improved multi-channel flat valve assembly has been incorporated in such a manner that the longitudinal axis of the multi-channel flat valve assembly is disposed at a substantially 45° angle with respect to the longitudinally extending side edge region of the inflatable dunnage or cargo air bag, and in particular, illustrates the manner by which the heat-sealed regions of the multi-channel flat valve assembly, which define the individual, separate fluid channels of the multi-channel flat valve assembly, effectively prevent the propagation of forces which tend to open the valve assembly when the inflatable dunnage or cargo air bag is inflated;

FIG. 9 is a top plan view showing the overall mounting of a second embodiment of an installation arm mechanism, upon which a combination cutting blade and valve holder mechanism is mounted, wherein the arm mechanism is adapted to undergo reciprocal 45° movements between a RETRACTED or LOAD position at which a multi-channel flat valve assembly is mounted within the valve holder mechanism, and an EXTENDED or INSTALLED position at which the multi-channel flat valve assembly is inserted into a side edge portion of an inflatable dunnage or cargo air bag so as to extend there therefrom at an angular orientation or disposition of approximately 45°;

DETAILED DESCRIPTION OF THE PREFERRED EMBODIMENT

Figure 1:
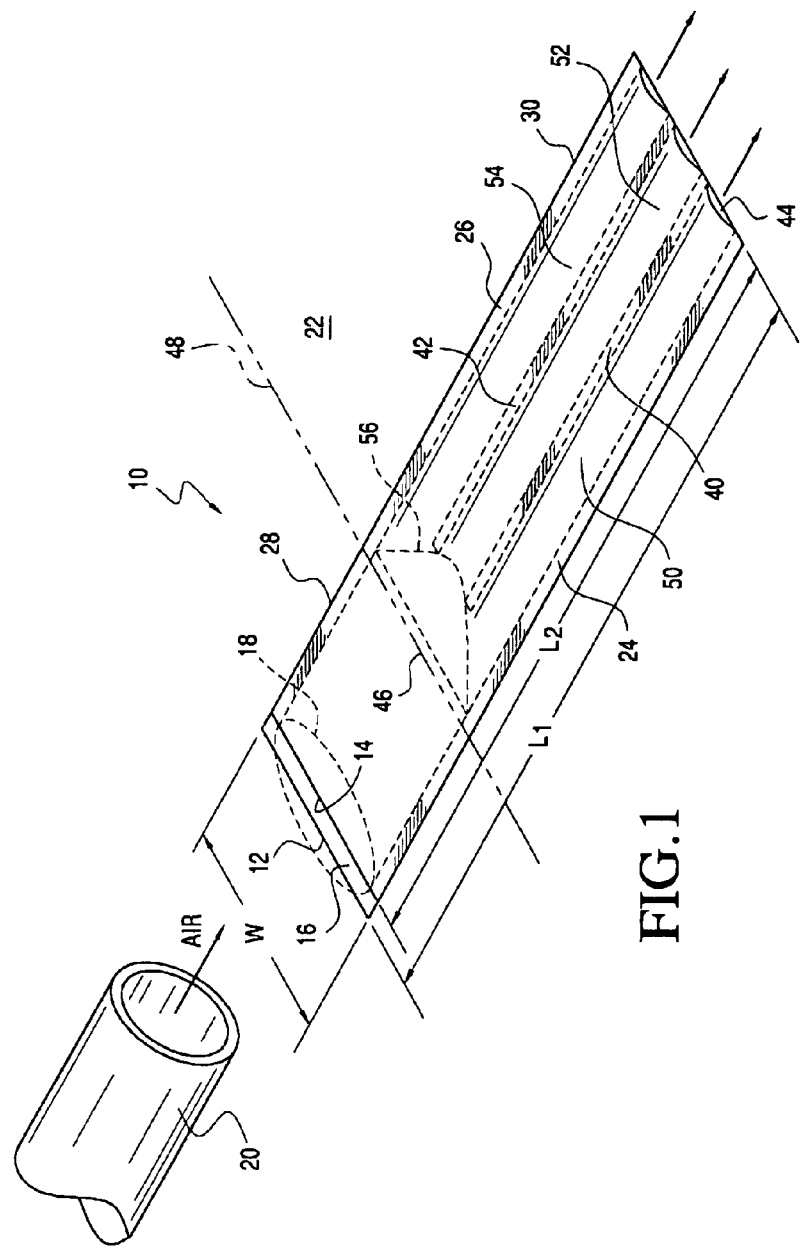
FIG. 1 is a perspective view of a new and improved multi-channel flat valve assembly which has been structured in accordance with the principles and teachings of the present invention, which shows the cooperative parts thereof, and which shows the multi-channel flat valve assembly as it is mounted within an inflatable dunnage or cargo air bag in preparation for its fluidic connection with a nozzle member of a source of compressed or pressurized air for inflating the inflatable dunnage or cargo air bag.

Referring now to the drawings, and more particularly to FIG. 1 thereof, a new and improved multi-channel flat valve assembly, which has been constructed in accordance with the principles and teachings of the present invention, is disclosed and is generally indicated by the reference character 10. The multi-channel flat valve assembly 10 is seen to comprise a pair of thermoplastic sheets or thermoplastic strips 12, 14 wherein the thermoplastic sheets or strips 12, 14 are fabricated from a suitable thermoplastic material, such as, for example, low density polyethylene (LDPE). It is noted that the thermoplastic sheet or strip 14 is disposed atop the thermoplastic sheet or strip 12 so as to be in surface-to-surface contact therewith, and while both of the thermoplastic sheets or strips 12, 14 have substantially the same width dimension W, the lower one 12 of the pair of thermoplastic sheets or strips 12, 14 has a length dimensions $L_1$ which is slightly larger than the length dimension $L_2$ of the upper one 14 of the pair of thermoplastic sheets or strips 12, 14. In this manner, the lower one 12 of the pair of thermoplastic sheets or strips 12, 14 projects outwardly beyond the upper one 14 of the pair of thermoplastic sheets or strips 12, 14 at the upstream or entrance end portion of the multi-channel flat valve assembly 10 so as to effectively define a lip member 16. The lip member 16 serves to facilitate the separation of the lower one 12 of the pair of thermoplastic sheets or strips 12, 14 from the upper one 14 of the pair of thermoplastic sheets or strips 12, 14 so as to effectively form an opening 18 within the upstream or entrance end portion of the multi-channel flat valve assembly 10 when, for example, a fill nozzle 20 of a source of compressed or pressurized air is to be inserted into the upstream or entrance end portion of the multi-channel flat valve assembly 10 so as to inflate the inflatable dunnage or cargo air bag 22 within which the multi-channel flat valve assembly 10 is fixedly mounted.

With reference continuing to be made to FIG. 1, and with additional reference being made to FIGS. 2 and 3b, it is seen that the lower and upper thermoplastic sheets or strips 12, 14 are adapted to be heat-sealed together along the longitudinally extending side edge portions thereof so as to effectively define a pair of laterally spaced side edge seam regions 24, 26. The laterally spaced side edge seam regions 24, 26 extend substantially the entire length of the multi-channel flat valve assembly 10, except within the region of the lip member 16, and it can be appreciated from FIGS. 1 and 2 that when the multi-channel flat valve assembly 10 is fixedly mounted within the inflatable dunnage or cargo air bag 22, an upstream or entrance portion 28 of the multi-channel flat valve assembly 10 extends or projects outwardly from the inflatable dunnage or cargo air bag 22 by means of a predetermined length dimension or amount, while a downstream or body portion 30 of the multi-channel flat valve assembly 10 is disposed internally within the inflatable dunnage or cargo air bag 22. As is known in the inflatable dunnage or cargo air bag art or industry, a typical inflatable dunnage or cargo air bag comprises, for example, an inflatable bladder, which is also formed from a suitable thermoplastic material and which is adapted to be disposed internally within an external paper bag, and a valve mechanism which is adapted to be fluidically connected to an interior portion of the inflatable bladder so as to facilitate the inflation and deflation of the same.

Accordingly, the multi-channel flat valve assembly 10, as constructed in accordance with the teachings and principles of the present invention, is adapted to be disposed within an inflatable bladder 32 as is illustrated within FIGS. 2 and 3b. More particularly, as disclosed within FIG. 3a, it is seen that in accordance with one of the unique and novel structural features characteristic of the multi-channel flat valve assembly 10, each laterally spaced side edge seam region, as exemplified by means of the side edge seam region 24, has an outwardly "bladed" or tapered structure such that the lateral edge portions of the lower and upper thermoplastic sheets or strips 12, 14 are mated or converged with respect to each other in such a manner that the outermost portion of the resulting side edge seam region 24 is pointed as at 34. As can therefore be further appreciated from FIG. 3b, when the multi-channel flat valve assembly 10 is incorporated within the inflatable bladder 32, the "bladed" or tapered structure, characteristic of each side edge seam region 24, 26 of the multi-channel flat valve assembly 10, permits the upper and lower plies 36,38 of the inflatable bladder 32 to be heat-sealed with respect to each side edge seam region 24, 26 of the multi-channel flat valve assembly 10 in the smoothest, flattest possible manner. In this manner, a stepwise interface, as would otherwise be defined between the upper and lower plies 36,38 of the inflatable bladder 32, and each side edge seam region 24, 26 of the multi-channel flat valve assembly 10, is effectively prevented. This is critically important in order to effectively prevent the generation of a possible defect within the sealed interfaces defined between the upper and lower plies 36,38 of the inflatable bladder 32 and each side edge seam region 24, 26 of the multi-channel flat valve assembly 10, wherein such a defect could possibly lead to the inadvertent and undesirable leakage of air out from the interior region of the inflatable bladder 32 whereby the inflated status of the inflatable bladder 32 may be compromised and may not be able to be maintained as and when desired.

Continuing further, and with reference still being made to FIGS. 1 and 2, another unique and novel feature characteristic of the multi-channel flat valve assembly 10 of the present invention resides in the provision or formation of, for example, a pair of heat-sealed regions 40, 42 which are oriented longitudinally within the multi-channel flat valve assembly 10 and which extend from the open terminal or exit end 44 of the downstream or body portion 30 of the multi-channel flat valve assembly 10 toward the upstream or entrance portion 28 of the multi-channel flat valve assembly 10. It is noted, however, that the upstream end portions of the heat-sealed regions 40, 42 terminate short of, or are disposed downstream from, the effective dividing line 46 which separates the upstream or entrance portion 28 of the multi-channel flat valve assembly 10, which is disposed externally of the inflatable bladder 32 and the inflatable dunnage or cargo air bag 22, from the downstream or body portion 30 of the multi-channel flat valve assembly 10, which is disposed internally of the inflatable bladder 32 and the inflatable dunnage or cargo air bag 22, the dividing line 46 also corresponding substantially with the edge portion 48 of the inflatable bladder 32 and the inflatable dunnage or cargo air bag 22. The heat-sealed regions 40, 42 are laterally or transversely spaced with respect to each other, as well as being respectively spaced from the laterally spaced side edge seam regions 24, 26 of the multi-channel flat valve assembly 10. Accordingly, the heat-sealed region 40 effectively cooperates with the side edge seam region 24 of the multi-channel flat valve assembly 10 so as to define a first longitudinally extending flow-through fluid channel 50, the pair of transversely spaced heat-sealed regions 40, 42 effectively cooperate together so as to define a second longitudinally extending flow-through fluid channel 52, and the heat-sealed region 42 effectively cooperates with the side edge seam region 26 of the multi-channel flat valve assembly 10 so as to define a third longitudinally extending flow-through fluid channel 54.

It is to be appreciated that, once the multi-channel flat valve assembly 10 has been installed within the inflatable dunnage or cargo air bag 22, in a manner that will be described more fully hereinafter, and once the inflatable bladder 32 has in fact been inflated to the desired pressurized state so as to in fact render the inflatable dunnage or cargo air bag 22 functional as an inflated dunnage or cargo air bag, the ambient pressure inside the inflatable bladder 32 of the inflated dunnage or cargo air bag will effectively act upon the external surfaces regions of those portions of the oppositely disposed lower and upper thermoplastic sheets or strips 12, 14 of the multi-channel flat valve assembly 10 which are disposed internally within the inflatable bladder 32 so as to tend to maintain the multi-channel flat valve assembly 10 in a flattened state whereby the same will effectively be CLOSED. However, as has also been noted hereinbefore, the ambient pressure, present within the inflatable bladder 32 as a result of the inflation of the inflatable bladder 32, will also exert forces upon those portions of the inflatable bladder 32 which are disposed within opposite upper and lower regions of the inflatable bladder 32 and which are integrally connected to those portions of the lower and upper thermoplastic sheets 12, 14 of the multi-channel flat valve assembly 10, located along the dividing line 46, which effectively form the mouth or entranceway into the downstream or body portion 30 of the multi-channel flat valve assembly 10. Accordingly, these pressurized forces will tend to open the mouth or entranceway into the downstream or body portion 30 of the multi-channel flat valve assembly 10.

As has also been noted hereinbefore in connection with the discussion of conventional or PRIOR ART flat valve assemblies, if such pressurized forces are not effectively checked or stopped, then such pressurized forces could effectively propagate downstream and cause the opening of the entire flat valve assembly which could of course adversely compromise the inflated status of the inflated dunnage or cargo air bag. In order to effectively counter such tendencies, the conventional or PRIOR ART flat valve assemblies have increased their effective length so as to effectively implement self-sealing characteristics to the valve assemblies. It has been noted further, however, that such increased length dimensions exhibit or create their own or additional operational difficulties in connection with the operational integrity of such conventional or PRIOR ART flat valve assemblies, such as, for example, the entanglement, twisting or folding of the flat valve assembly with respect to itself, which, in turn, leads to problems or difficulties in achieving proper and timely inflation or deflation of the inflatable dunnage or cargo air bag. Therefore, in accordance with the unique and novel principles and teachings of the present invention, it is submitted that as a result of the provision of the plurality of heat-sealed regions 40, 42, and the consequent creation of the multiple flow-through fluid channels 50, 52, 54 within the multi-channel flat valve assembly 10 of the present invention, the aforenoted problems comprising the unintentional and undesirable opening of the flat valve assembly, when the inflatable dunnage or cargo air bag 22 has in fact been inflated to its operational level, is effectively overcome without necessarily increasing the length dimension of the flat valve assembly.

More particularly, as can best be seen in FIGS. 1 and 2, as the pressure forces tend to separate the lower and upper thermoplastic sheets 12, 14 from each other, an opening between such lower and upper thermoplastic sheets 12, 14 is formed along the aforenoted dividing line 46 and begins to propagate downstream into and through the mouth or entranceway of the downstream or body portion 30 of the multi-channel flat valve assembly 10. This downstream propagation or movement tends to be effectively centrally or axially located within the multi-channel flat valve assembly 10, as schematically illustrated at 56, in view of the fact that the laterally spaced side edge regions of the lower and upper thermoplastic sheets or strips 12, 14 are sealed with respect to each other along the side edge seam region 24, 26. It can therefore be appreciated, however, that when the propagation front 56 effectively encounters the upstream end portions of the intermediate heat-sealed regions 40, 42, further downstream propagation of such front 56, tending to separate the lower and upper thermoplastic sheets or strips 12, 14 from each other and tending to thereby open the flat valve assembly 10, will effectively be halted and prevented. In addition to the provision of the intermediate, longitudinally extending heat-sealed regions 40, 42, the internal, oppositely disposed or oppositely facing surface portions of the lower and upper thermoplastic sheets or strips 12, 14 can also be provided with a suitable tackifier 58. In this manner, a predetermined degree, or predetermined amount, of inherent adhesion is defined or effectively developed between the pair of lower and upper thermoplastic sheets or strips 12, 14 so as to tend to maintain the pair of lower and upper thermoplastic sheets or strips 12, 14 in contact with each other and thereby maintain the multi-channel flat valve assembly 10 in a CLOSED state, other than when an actual, desired, intended inflation or deflation operation is being implemented.

Figure 4:
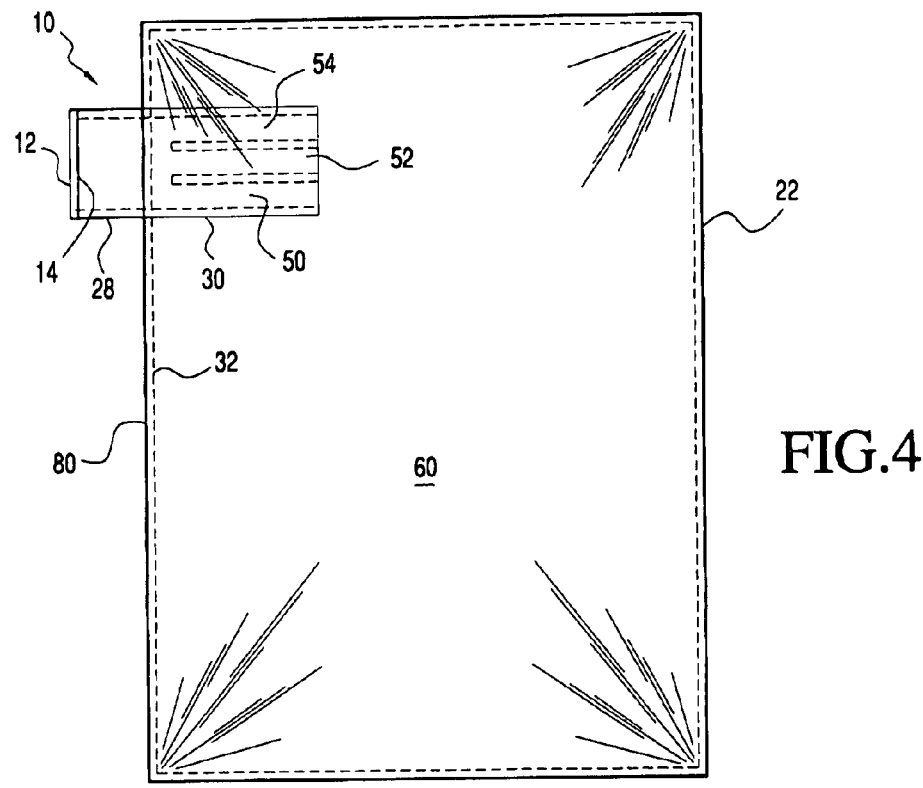
FIG. 4 is a top plan view of an inflatable dunnage or cargo air bag within which a new and improved multi-channel flat valve assembly has been incorporated in such a manner that the longitudinal axis of the multi-channel flat valve assembly is disposed substantially perpendicular to a longitudinally extending side edge region of the inflatable dunnage or cargo air bag.

Having described the unique and novel structural features characteristic of the new and improved multi-channel flat valve assembly 10, the installation of the new and improved multi-channel flat valve assembly 10 within the inflatable dunnage or cargo air bag 22 will now be described. With reference therefore being made to FIG. 4, a completely assembled inflatable dunnage or cargo air bag 22 is disclosed as having a multi-channel flat valve assembly 10 fixedly disposed or mounted within a corner region thereof. It is to be noted that the mounting of the multi-channel flat valve assembly 10 within the corner region of the inflatable dunnage or cargo air bag 22 facilitates the proper and complete inflation of the inflatable dunnage or cargo air bag 22 in view of the fact that the operator or technician can effectively simultaneously support the upper region of the inflatable dunnage or cargo air bag 22 as a result of being able to support the corner region of the inflatable dunnage or cargo air bag 22 through means of the fluidic connection established between the fill nozzle 20 and the multi-channel flat valve assembly 10. The inflatable dunnage or cargo air bag 22 comprises, for example, an outer sheath comprising one or more paper plies 60, the inflatable bladder 32 disposed internally thereof, and the new and improved multi-channel flat valve assembly 10 fixedly mounted within, and hermetically sealed to, the inflatable bladder 32.

As can be further appreciated, the multi-channel flat valve assembly 10 projects outwardly through both the internal bladder 32 as well as the externally disposed one or more paper plies 60 such that the upstream or entrance portion 28 of the multi-channel flat valve assembly 10 is disposed externally of the inflatable dunnage or cargo air bag 22 so as to in fact be readily accessible for fluidic connection with the fill nozzle 20 of the suitable source of pressurized or compressed air as has also been illustrated within FIG. 1. It is further noted, in accordance with a first embodiment of the completed inflatable dunnage or cargo air bag 22, as illustrated within FIG. 4, that the longitudinal axis of the multi-channel flat valve assembly 10 is disposed substantially perpendicular to the side edge portion 48 of the inflatable dunnage or cargo air bag 22. Consequently, in order to therefore insert and mount the multi-channel flat valve assembly 10 within the inflatable dunnage or cargo air bag 22 so as to effectively fabricate a substantially completed inflatable dunnage or cargo air bag 22, the apparatus as disclosed within FIG. 5 is employed.

Figure 5:
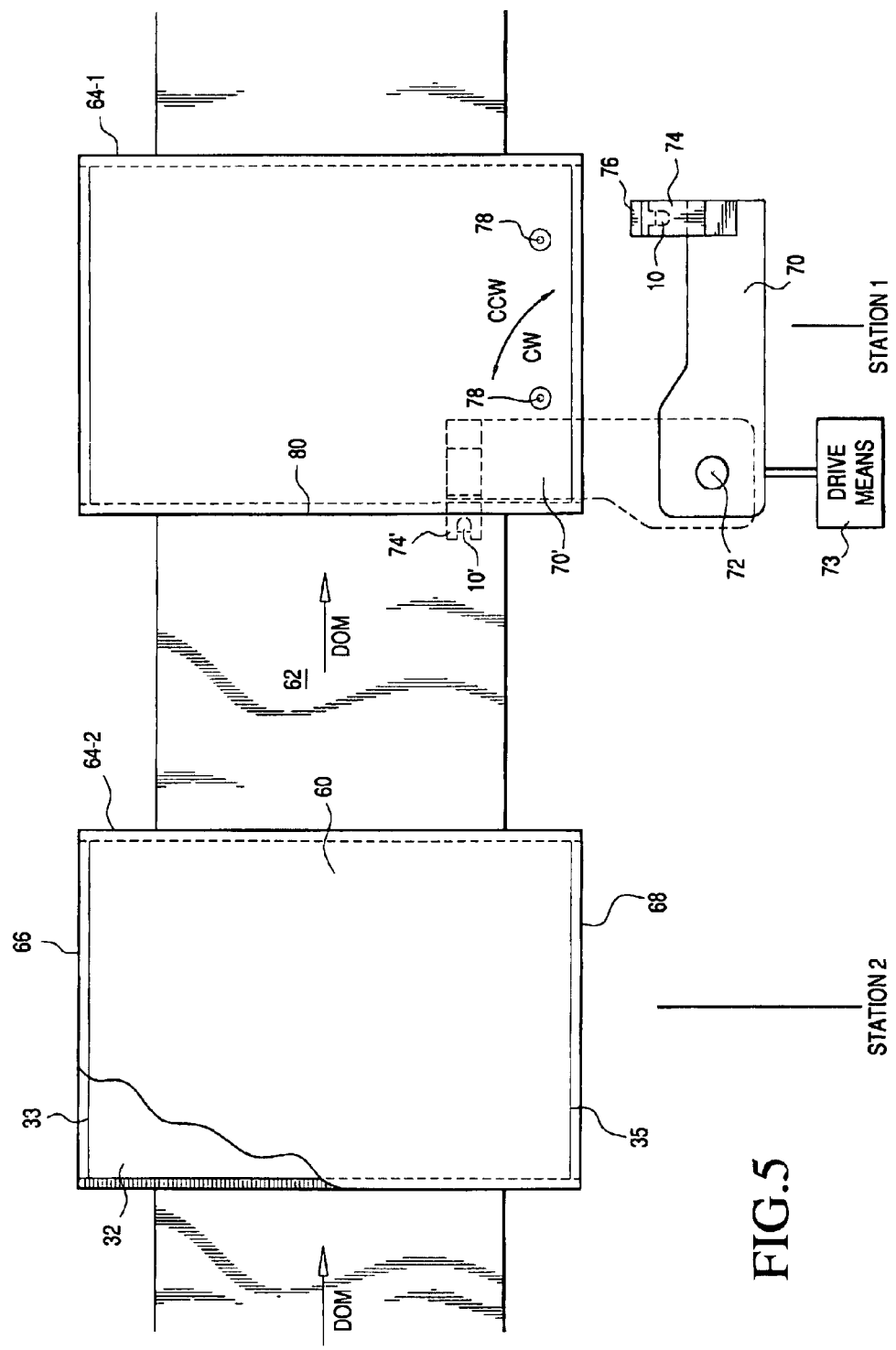
FIG. 5 is a schematic view showing the indexable movement of an inflatable dunnage or cargo air bag, which is sealed along the oppositely disposed, longitudinally extending side edge portions thereof but which is open along the oppositely disposed, transversely extending end edge portions thereof, in order to implement the insertion of the new and improved multi-channel flat valve assembly into the inflatable dunnage or cargo air bag, and the fixed mounting of the multi-channel flat valve assembly within the side edge region of the inflatable dunnage or cargo air bag, by means of a suitable blade and valve-holder mechanism which is adapted to undergo 90° reciprocal movements between a RETRACTED position at which multi-channel flat valve assemblies are individually mounted upon the valve-holder mechanism, and an EXTENDED position at which each multi-channel flat valve assembly, that is mounted upon the valve-holder mechanism, will be mounted within a side edge portion of the inflatable dunnage or cargo air bag.

More particularly, as illustrated within FIG. 5, it is seen that the apparatus of the present invention comprises, in effect, an indexable conveyor mechanism 62 upon which a plurality of inflatable dunnage or cargo air bag assemblies, such as, for example, 64-1, 64-2, are mounted in a longitudinally spaced array as considered in the direction of movement DOM of the conveyor mechanism 62. It is to be appreciated that each one of the inflatable dunnage or cargo air bag assemblies 64-1, 64-2 comprises one of the internally disposed inflatable bladder members 32 which is encased or enveloped within the one or more of the paper plies 60, however, at this stage of the inflatable dunnage or cargo air bag fabrication process, it is further appreciated that the opposite ends 66, 68 of the one or more paper plies 60, as well as the opposite ends 33, 35 of the inflatable bladder members 32, have not as yet been sealed and are therefore open.

Figure 6A:
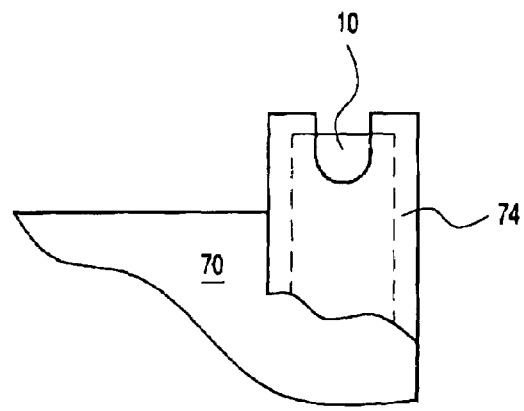
FIGS. 6a-6c are schematic, enlarged views, corresponding to FIG. 5, showing the stepwise insertion of the new and improved multi-channel flat valve assembly into the side edge portion of the inflatable dunnage or cargo airbag.

With reference continuing to be made to FIG. 5, it is noted still further that a first or leading one of the inflatable dunnage or cargo air bag assemblies 64-1 has been indexed to a first multi-channel flat valve assembly installation station which has been denoted or designated as STATION 1, while a second one of the inflatable dunnage or cargo air bag assemblies 64-2 has been indexed to a second multi-channel flat valve assembly waiting station which has been denoted or designated as STATION 2. A reciprocating arm mechanism 70 is mounted at a position which is adjacent to the installation station, STATION 1, of the conveyor mechanism 62 for the purpose of installing a multi-channel flat valve assembly 10 within each one of the inflatable dunnage or cargo air bag assemblies as each one of the multi-channel flat valve assemblies 10 is indexably presented to and disposed at the installation station, STATION 1. The installation arm mechanism 70 is capable of undergoing 90° arcuate movements in both the counterclockwise CCW and clockwise CCW directions with respect to a pivotal axis 72, under the influence of a suitable drive means 73, and it is therefore appreciated, for example, that the installation arm mechanism 70 is pivotally movable between a first LOAD position, as illustrated in solid lines, and a second INSTALLED position, as illustrated in dotted lines. In addition, it can also be appreciated from FIGS. 6a-6c that a valve holder implement 74 is fixedly mounted upon a distal end portion of the installation arm mechanism 70 in such a manner that the longitudinal axis of the valve holder implement 74 is disposed substantially perpendicular to the longitudinal axis of the installation arm mechanism 70. One of the multi-channel flat valve assemblies 10 is adapted to be fixedly mounted and retained within the valve holder implement 74, and in addition, a cutting blade implement 76 is reciprocably mounted upon the valve holder implement 74 so as to be movable between an EXTENDED position and a RETRACTED position. As can therefore be readily surmised, and as will be even more fully disclosed hereinafter, when the installation arm mechanism 70 is disposed at the LOAD position, the cutting blade implement 76 is initially disposed at its RETRACTED position so as to permit one of the multi-channel flat valve assemblies 10 to be mounted within the valve holder mechanism 74, as illustrated within FIG. 6a, and subsequently, the retractable cutting blade implement 76 is moved from its RETRACTED position to its EXTENDED position as illustrated within FIG. 5. The installation arm mechanism 70 is now ready to install the multi-channel flat valve assembly 10 within the first inflatable dunnage or cargo air bag assembly 64-1 disposed at the installation station, STATION 1.

It will be recalled that the opposite ends 66, 68 of the paper plies 60 of the inflatable dunnage or cargo air bag assemblies 64-1, 64-2, as well as the opposite ends 33, 35 of the inflatable bladder members 32, have not as yet been sealed and are therefore open in order to in fact facilitate the insertion of the multi-channel flat valve assembly 10 into the first inflatable dunnage or cargo air bag assembly 64-1. It can be appreciated, however, that in order to achieve such an operation, the oppositely disposed one or more of the external paper plies 60, as well as the oppositely disposed plies 36, 38 comprising the inflatable bladder member 32, must effectively be separated from each other. Accordingly, a plurality of vacuum or suction cup assemblies 78 are also disposed at the installation station, STATION 1, so as to be in position to effectively act upon the opposite sides of each one of the inflatable dunnage or cargo air bag assemblies 64-1, 64-2 when the same is indexed to the installation station, STATION 1. The vacuum or suction cup assemblies 78 are mounted upon suitable reciprocal support means, not shown, so as to be movable, for example, toward and away from the conveyor mechanism 62.

In this manner, the vacuum or suction cup assemblies 78 may initially be moved or disposed away from the conveyor mechanism 62 so as to permit the conveyor mechanism 62 to index the first or leading one of the inflatable dunnage or cargo air bag assemblies 64-1 to the installation station, STATION 1. The vacuum or suction cup assemblies 78 may then be moved toward the conveyor mechanism 62 until the vacuum or suction cup assemblies 78 are disposed adjacent to the oppositely disposed external side surfaces of the outermost paper ply 60 comprising the first inflatable dunnage or cargo air bag assembly 64-1. Subsequently, still further, the vacuum or suction cup assemblies 78 will be activated, and in this manner, the oppositely disposed one or more paper plies 60, as well as the oppositely disposed plies 36, 38 comprising the inflatable bladder member 32, will effectively be attracted toward and moved into contact with the vacuum or suction cup assemblies 78 so as to effectively be separated from each other and thereby permit the valve holder mechanism 74, having a multi-channel flat valve assembly 10 disposed therein, to be inserted between the oppositely disposed one or more paper plies 60, as well as the oppositely disposed plies 36, 38 comprising the inflatable bladder member 32, as the installation arm mechanism 70 is pivotally moved in the counterclockwise direction CCW.

It is to be noted that, in connection with the attraction of the oppositely disposed one or more paper plies 60, as well as the oppositely disposed plies 36, 38 comprising the inflatable bladder member 32, toward and into contact with the vacuum or suction cup assemblies 78 when the vacuum or suction cup assemblies 78 are in fact activated, so as to effectively ensure the separation of the oppositely disposed plies 36, 38 with respect to each other and along with the oppositely disposed one or more paper plies 60, the externally disposed paper plies 60 comprising each one of the inflatable dunnage or cargo air bag assemblies 64-1, 64-2 are sufficiently porous so as to permit the vacuum or suction forces to in effect act upon the oppositely disposed plies 36, 38 comprising the internal inflatable bladder member 32. Alternatively, a thin bead of adhesive, for example, may be interposed between each external surface portion of each one of the oppositely disposed plies 36, 38 comprising the internal inflatable bladder member 32 and the internal surface portion of the innermost one of the one or more paper plies 60 comprising each one of the inflatable dunnage or cargo air bag assemblies 64-1, 64-2 such that when the vacuum or suction cup assemblies 78 act upon the one or more paper plies 60 comprising each one of the inflatable dunnage or cargo air bag assemblies 64-1, 64-2 in order to effectively separate the oppositely disposed paper plies from each other, the oppositely disposed plies 36, 38 comprising the internal inflatable bladder member 32 will be correspondingly moved and separated from each other.

Continuing further, and with reference still being made to FIGS. 5 and 6a-6c, subsequent to the activation of the vacuum or suction cup assemblies so as to in fact achieve the separation of the oppositely disposed plies 36, 38 of the inflatable bladder member 32 with respect to each other and along with the separation of the oppositely disposed one or more paper plies 60 comprising the first inflatable dunnage or cargo air bag assembly 64-1, the installation arm 70 is rotated in the counterclockwise direction CCW from the solid line or LOAD position to the dotted line or INSTALLED position, as illustrated within FIG. 5, so as to in fact pass between the separated plies 36, 38 of the inflatable bladder member 32 and the separated plies 60 comprising the first inflatable dunnage or cargo air bag assembly 64-1. Accordingly, as the installation arm 70 nears the end of its counter-clockwise arcuate 90° movement, and approaches its INSTALLED position, the EXTENDED cutting blade implement 76 will effectively pierce and cut through the side edge portions of the inflatable bladder member 32 and the one or more paper plies 60 comprising the first inflatable dunnage or cargo air bag assembly 64-1, whereby the multi-channel flat valve assembly 10 will in fact be inserted within the side edge portion 80 of the first inflatable dunnage or cargo air bag assembly 64-1 as a result of the installation arm 70 completing its arcuate 90° movement. It is additionally noted that when the installation arm is disposed at the INSTALLED position, it is denoted as 70', and similarly for the valve holder mechanism 74' and the multi-channel flat valve assembly 10' mounted therein.

Figure 6B:
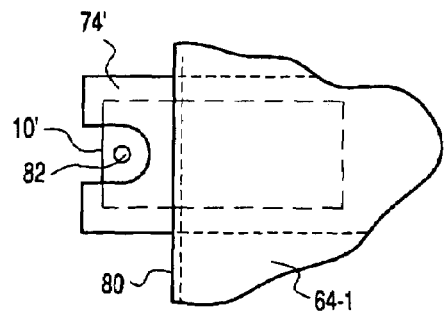
Figure 6C:
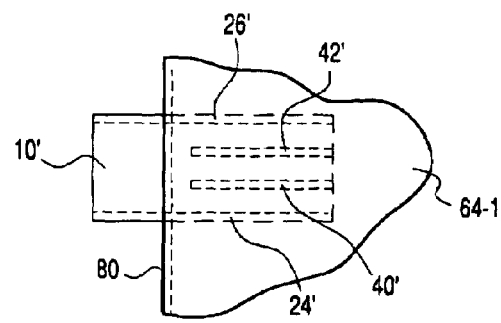
Figure 10:
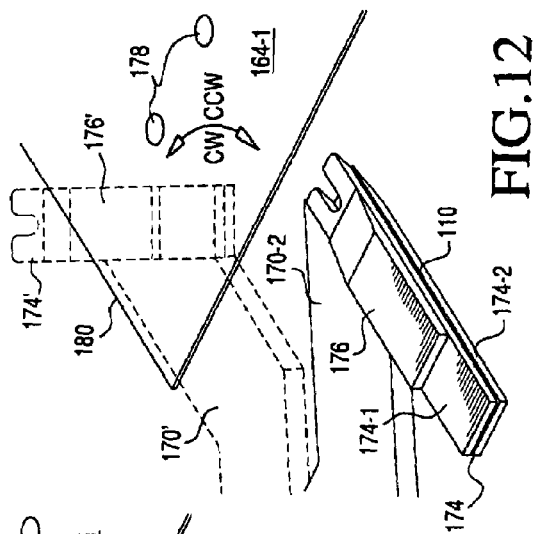
FIG. 10 is a detailed, schematic, top perspective view showing the combination blade and valve holder mechanism disposed in its OPEN position so as to permit the insertion of a multi-channel flat valve assembly into the same in preparation for the insertion and mounting of the multi-channel flat valve assembly into inflatable dunnage or cargo airbag at its 45° angular orientation or disposition as illustrated within FIGS. 7 and 8.
Figure 11:
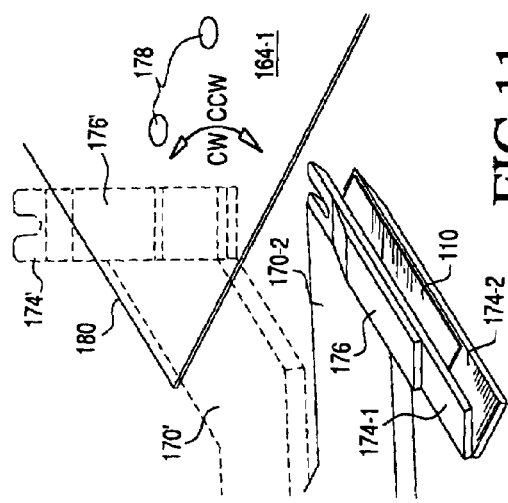
FIG. 11 is a detailed, schematic, top perspective view similar to that of FIG. 10 showing, however, the combination blade and valve holder mechanism disposed in its OPEN position and into which a multi-channel flat valve assembly has in fact been inserted in preparation for the insertion and mounting of the multi-channel flat valve assembly into an inflatable dunnage or cargo airbag at the desired 45° angular orientation or disposition as illustrated within FIGS. 7 and 8.
Figure 12:
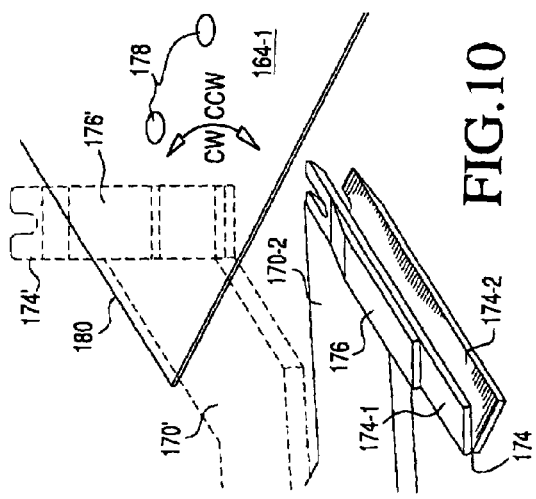
FIG. 12 is a detailed, schematic, top perspective view similar to those of FIGS. 10 and 11 showing, however, the combination blade and valve holder mechanism disposed in its CLOSED position so as to fixedly house and contain the multi-channel flat valve assembly which is to be inserted and mounted within the inflatable dunnage or cargo airbag at the desired 45° angular orientation or disposition as illustrated within FIGS. 7 and 8, it being further noted that the blade implement is shown in its RETRACTED position.

Having effectively installed the multi-channel flat valve assembly 10 within the first inflatable dunnage or cargo air bag assembly 64-1, it is now necessary to fixedly secure the multi-channel flat valve assembly 10 within the first inflatable dunnage or cargo air bag assembly 64-1 as well as to simultaneously seal the interface defined between side edge portion 80 of the first inflatable dunnage or cargo air bag assembly 64-1 and the multi-channel flat valve assembly 10 within the region at which the cutting blade implement 76 has pierced the side edge portion 80 of the first inflatable dunnage or cargo air bag assembly 64-1. With reference therefore being made to FIG. 6b, once the multi-channel flat valve assembly 10 has been mounted or installed within the side edge portion 80 of the first inflatable dunnage or cargo air bag assembly 64-1, the cutting blade implement 76 will be moved to its RETRACTED position. In addition, a pair of clamping mechanisms 82, only one of which is visible, are disposed upon opposite sides of the valve holder mechanism 74, and the multi-channel flat valve assembly 10 disposed therein, so as to be in position to effectively grab or clamp the opposite sides of the multi-channel flat valve assembly 10 which is interposed therebetween. The clamping mechanisms 82 are reciprocably mounted so as to be movable toward and away from each other, and accordingly, when the clamping mechanisms 82 are moved toward each other, the clamping mechanisms 82 can fixedly retain the multi-channel flat valve assembly 10' therebetween. Subsequently, while the clamping mechanisms 82 retain the multi-channel flat valve assembly 10' therebetween, the installation arm 70 is arcuately rotated in the clockwise direction CW back toward its LOAD position such that the multi-channel flat valve assembly 10' will effectively be released or separated from the valve holder mechanism 74 whereby only the multi-channel flat valve assembly 10' will now be disposed within the side edge portion 80 of the first inflatable dunnage or cargo air bag assembly 64-1. Subsequently still further, after the clamping mechanisms 82 have been returned to their RETRACTED positions, the side edge portion 80 of the first inflatable dunnage or cargo air bag assembly 64-1 and the multi-channel flat valve assembly 10' can effectively be hermetically sealed together at the interface defined between the side edge portion 80 of the first inflatable dunnage or cargo air bag assembly 64-1 and the multi-channel flat valve assembly 10' by means of suitable heat-sealing techniques. Since the installation of the multi-channel flat valve assembly 10' within the first inflatable dunnage or cargo air bag assembly 64-1 has now been completed, the conveyor mechanism 62 can now be indexed so as to effectively convey the first inflatable dunnage or cargo air bag assembly 64-1 downstream for further processing, such as, for example, to have the opposite ends 66, 68 thereof closed and sealed, while the second inflatable dunnage or cargo air bag assembly 64-2 will now be moved from the waiting station, STATION 2, to the installation station, STATION 1, whereby the entire installation cycle can be repeated.

Figure 7:
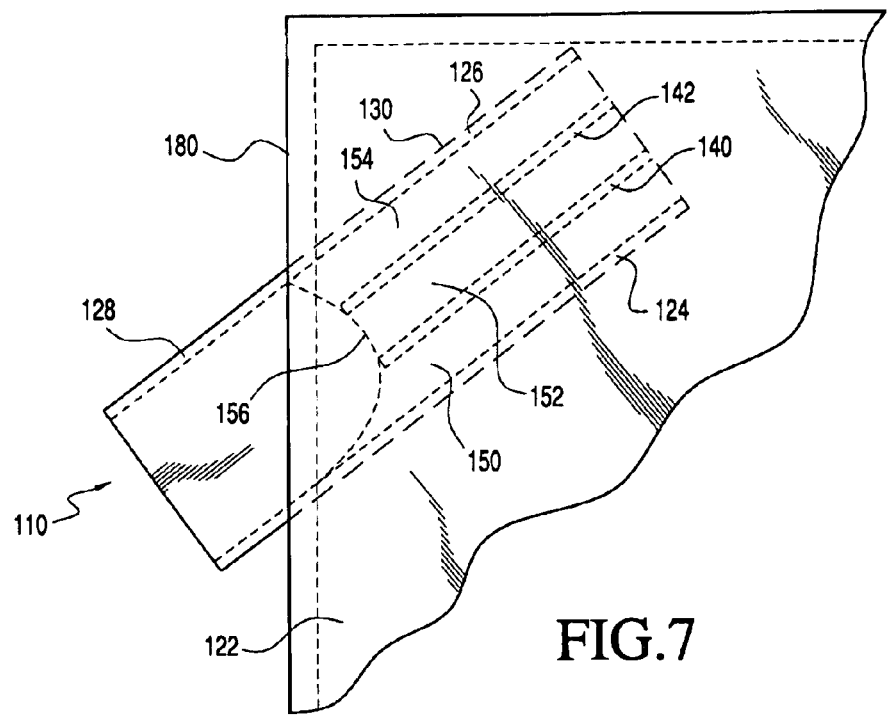
FIG. 7 is a top plan view, similar to that of FIG. 4, showing a corner region of an inflatable dunnage or cargo air bag within which a new and improved multi-channel flat valve assembly has been incorporated in such a manner that the longitudinal axis of the multi-channel flat valve assembly is disposed at a substantially 45° angle with respect to the longitudinally extending side edge region of the inflatable dunnage or cargo air bag.

With reference now being made to FIGS. 7 and 8, in accordance with a second embodiment of a completed inflatable dunnage or cargo air bag 122, it is to be appreciated that the longitudinal axis of the multi-channel flat valve assembly 110 is disposed at a predetermined angle, such as, for example, 45°, with respect to the side edge portion 180 of the inflatable dunnage or cargo air bag 122 such that the upstream or entrance portion 128 of the multi-channel flat valve assembly 110 extends or is oriented downwardly. The reason for this angular orientation of the multi-channel flat valve assembly 110, with respect to the side edge portion 180 of the inflatable dunnage or cargo air bag 122, is that if the size of the inflatable dunnage or cargo air bag 122 is substantially large whereby the inflatable dunnage or cargo air bag 122 has a substantial vertical height dimension, the angular orientation of the inflatable dunnage or cargo air bag 122, wherein the upstream or entrance portion 128 of the multi-channel flat valve assembly 110 extends or is oriented downwardly, permits installation personnel or technicians to fluidically connect the fill nozzle 20 to the upstream or entrance portion 128 of the multi-channel flat valve assembly 110 in a readily easy and ergonomically comfortable manner while also permitting the installation personnel or technicians to adequately support the multi-channel flat valve assembly 110 and the upper region of the inflatable dunnage or cargo airbag 122 so as to ensure the proper and complete inflation of the same. Consequently, in order to therefore insert and mount the multi-channel flat valve assembly 110 within the inflatable dunnage or cargo air bag 122 so as to effectively fabricate a substantially completed inflatable dunnage or cargo air bag 122, the apparatus as disclosed within FIGS. 9-14 is employed.

More particularly, it is initially noted that, in connection with the apparatus, as disclosed within FIGS. 9-14, for inserting and mounting the multi-channel flat valve assembly 110 within the inflatable dunnage or cargo air bag 122 in such a manner that the longitudinal axis of the multi-channel flat valve assembly 110 is disposed at a predetermined angle, such as, for example, 45°, with respect to the side edge portion 148 of the inflatable dunnage or cargo air bag 122, the only primary difference between the apparatus as disclosed within FIGS. 9-14 for inserting and mounting the multi-channel flat valve assembly 110 within the inflatable dunnage or cargo air bag 122, and the apparatus, as disclosed within FIG. 5, for inserting and mounting the multi-channel flat valve assembly 10 within the inflatable dunnage or cargo air bag 22, or more particularly, within any one of the plurality of inflatable dunnage or cargo air bag assemblies 64-1 or 64-2, resides in the structure comprising the installation arm 170 and the valve holder implement 174 mounted thereon. It is therefore to be further appreciated that the indexable conveyor mechanism 62, as illustrated within FIG. 5 and used in conjunction with the installation arm 70 and the valve holder implement 74 for inserting and mounting the multi-channel flat valve assembly 10 within the inflatable dunnage or cargo air bag 22, can likewise be used in connection with the installation arm 170 and the valve holder implement 174 for inserting and mounting the multi-channel flat valve assembly 110 within the inflatable dunnage or cargo air bag 122. Therefore, the following discussion will be directed toward or confined to the particular structure comprising the installation arm 170 and the valve holder implement 174 for inserting and mounting the multi-channel flat valve assembly 110 within the inflatable dunnage or cargo air bag 122.

As can best be appreciated from FIG. 9, which essentially corresponds to the installation station, STATION 1, as illustrated within FIG. 5, it is to be initially noted that those structural components which comprise the apparatus illustrated within FIG. 9 and which correspond to those structural components which comprise the apparatus illustrated within FIG. 5 will be designated by similar reference characters except that they will be in the 100 series. In addition, it is noted further that when the apparatus components are disposed at the first LOAD position, the structural components will be denoted by their appropriate reference characters, whereas when the apparatus components are disposed at the second INSTALLED position, the structural components will be denoted by their appropriate reference characters supplemented by means of a prime ('). Accordingly, in order to achieve the mounting of the multi-channel flat valve assembly 110 within the side edge portion 180 of the first inflatable dunnage or cargo air bag assembly 164-1 which will be disposed at the installation station, STATION 1, wherein the multi-channel flat valve assembly 110 will be disposed at an angular orientation of, such as, for example, 45° with respect to the side edge portion 180 of the first inflatable dunnage or cargo air bag assembly 164-1, it is seen that, in lieu of the linear installation arm 70 as utilized within the first embodiment apparatus as illustrated within FIG. 5, the installation arm 170 has a composite structure.

More particularly, it is seen that the installation arm 170 comprises a first section 170-1 which is pivotally mounted, at a first proximal end portion thereof, around a pivot axis 172, and a second section 170-2 which is integrally connected to a second distal end portion of the first section 170-1 of the installation arm 170 so as to effectively extend or project outwardly from the first section 170-1 of the installation arm 170 at a predetermined angle of, such as, for example, 45°. A valve holder implement 174 is fixedly mounted upon the distal end portion of the second section 170-2 of the installation arm 170, and it is to be noted that the longitudinal axis of the valve holder implement 174 is effectively disposed at a predetermined angle, such as, for example, 45°, with respect to the longitudinal axis of the second section 170-2 of the installation arm 170 such that the valve holder implement 174 is disposed substantially perpendicular to the longitudinal axis of the first section 170-1 of the installation arm 170. In this manner, when the installation arm 170 is rotated in the counterclockwise direction CCW, and through an angular sector comprising 45°, so as to move from the LOAD position to the INSTALLATION position under the influence of the drive means 173, the cutting blade implement 176 and the valve holder implement 174 will be disposed at a 45° orientation with respect to the side edge portion 180 of the inflatable dunnage or cargo air bag assembly 164-1 so as to, in turn, install the multi-channel flat valve assembly at a 45° orientation within the side edge portion 180 of the inflatable dunnage or cargo air bag assembly 164-1 as denoted at 110'.

With reference now being made to FIGS. 10-14, the detailed structure, and operation of, for example, the valve holder implement 174, and the cutting blade implement 176, will now be described. As can be clearly seen in FIG. 10, the valve holder implement 174 has a substantially clamshell structure comprising a first upper member 174-1 and a second lower member 174-2 wherein the first upper member 174-1 is pivotally mounted with respect to the second lower member 174-2 so as to be movable between OPENED and CLOSED positions under the influence of the drive means 173. Accordingly, when the upper and lower valve holder members 174-1, 174-2 are disposed in their relatively OPENED positions as illustrated within FIGS. 10 and 11, one of the multi-channel flat valve assemblies 110 may be inserted into the space defined therebetween. Subsequently, the upper valve holder member 174-1 may be closed with respect to the lower valve holder member 174-2, as illustrated within FIG. 12, so as to fixedly or clampingly retain the multi-channel flat valve assembly 110 within the valve holder implement 174. At this point in time, that is, during the loading of one of the multi-channel flat valve assemblies 110 into the valve holder implement 174, it is noted that the cutting blade implement 176 is disposed at its RETRACTED position, as illustrated within FIGS. 10-12, however, subsequent to the loading and fixation of the multi-channel flat valve assembly 110 within the CLOSED valve holder implement 174, the cutting blade implement 176 will be moved from its RETRACTED position, as illustrated within FIGS. 10-12, to its EXTENDED position, as illustrated within FIGS. 13 and 14, under the influence of the drive means 173.

Figure 14:
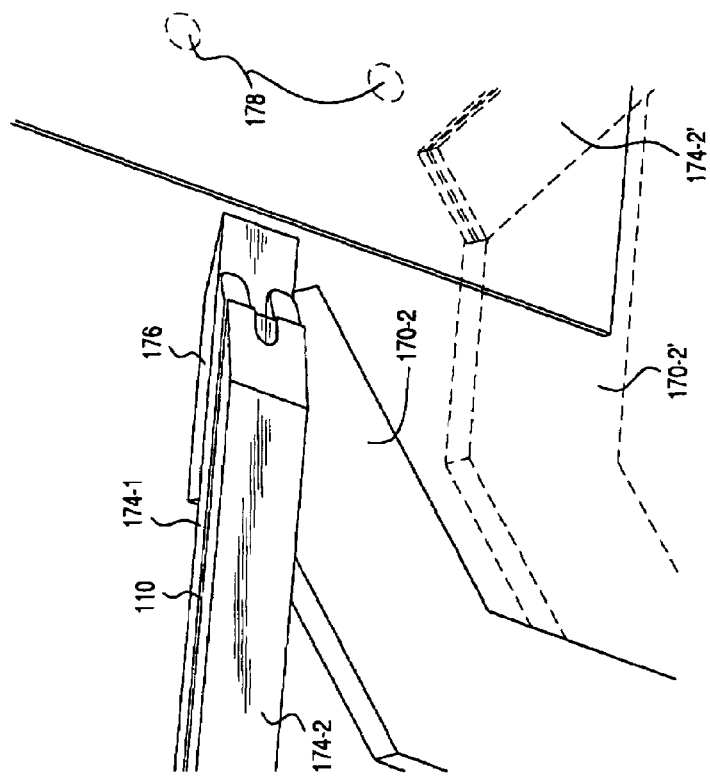
FIG. 14 is a detailed, schematic, bottom perspective view similar to that of FIG. 13 in that the combination blade and valve holder mechanism is disposed in its CLOSED position so as to fixedly house and contain the multi-channel flat valve assembly which is to be inserted and mounted within the inflatable dunnage or cargo airbag at the desired 45° angular orientation or disposition as illustrated within FIGS. 7 and 8, and wherein further, the blade implement is shown in its EXTENDED position so as to clearly extend beyond the distal end of the valve holder.
Figure 13:
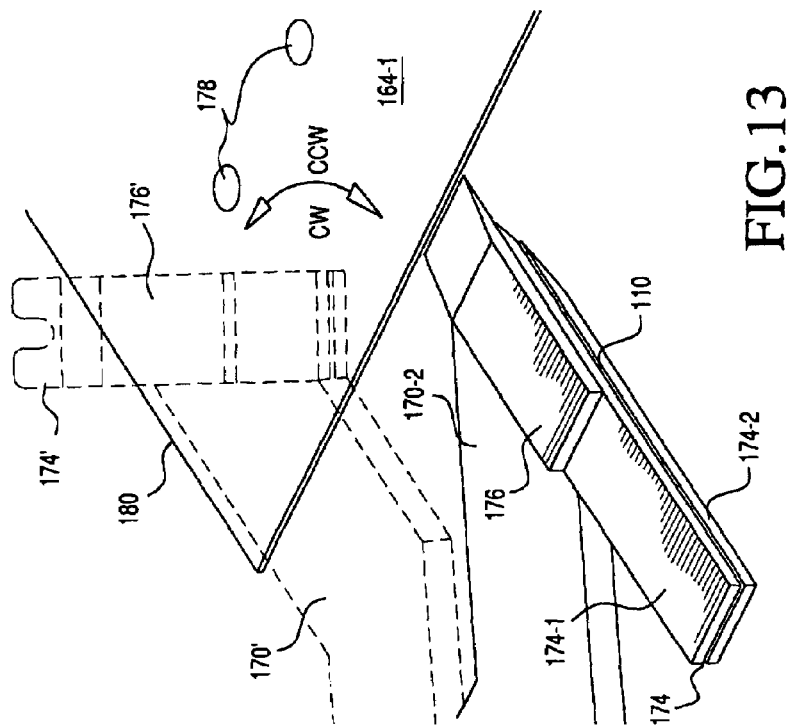
FIG. 13 is a detailed, schematic, top perspective view similar to that of FIG. 12 in that the combination blade and valve holder mechanism is disposed in its CLOSED position so as to fixedly house and contain the multi-channel flat valve assembly which is to be inserted and mounted within the inflatable dunnage or cargo airbag at the desired 45° angular orientation or disposition as illustrated within FIGS. 7 and 8, it being further noted, however, that the blade implement is shown in its EXTENDED position.

It is to be noted that when the cutting blade implement 176 is disposed at its EXTENDED position as illustrated within FIGS. 13 and 14, the distal cutting blade portion of the cutting blade implement 176 projects beyond the distal end portion of the valve holder implement 174 so as to in fact be capable of piercing and cutting the side edge portion 180 of the first inflatable dunnage or cargo air bag assembly 164-1. It can therefore be appreciated still further that, at this point in time, the combination valve holder and cutting blade mechanism 174, 176 is now in position, and ready to be activated, so as to undergo the previously noted arcuate movement, comprising the 45° angular rotation in the counter-clockwise direction CCW, so as to in fact achieve the installation of the multi-channel flat valve assembly 110 within the side edge portion 180 of the inflatable dunnage or cargo air bag assembly 164-1 as has been schematically illustrated and previously discussed in connection with FIG. 9. As has been previously noted in connection with the installation of the multi-channel flat valve assembly 10 within the side edge portion 80 of the inflatable dunnage or cargo air bag assembly 64-1, suitable vacuum or suction cup assemblies 178 are activated so as to separate the plastic and paper plies of the inflatable bladder member and the enveloping paper casing comprising the inflatable dunnage or cargo air bag assembly 164-1.

Subsequent to the installation of the multi-channel flat valve assembly 110 within the side edge portion 180 of the inflatable dunnage or cargo air bag assembly 164-1, the cutting blade implement 176 is returned to its RETRACTED position from its EXTENDED position, and the clamping mechanisms, not shown in FIGS. 9-14 but similar to those illustrated at 82 in FIG. 6b, will be moved into position for grabbing or clamping the multi-channel flat valve assembly 110 disposed within the valve holder implement 174. The upper valve holder member 174-1 will then be opened with respect to the lower valve holder member 174-2, in a manner similar to that illustrated within FIGS. 10 and 11, so as to effectively release the clamping state of the valve holder implement 174 with respect to the multi-channel flat valve assembly 110, and upon arcuate movement of the combination valve holder implement and cutting blade implement assembly 174, 176 in the clockwise direction CW from the INSTALLATION position back to the LOAD position, the combination valve holder implement and cutting blade implement assembly 174, 176 is withdrawn from its position, interposed between the plastic and paper plies of the inflatable bladder and enveloping paper casing comprising the inflatable dunnage or cargo air bag assembly 164-1, whereby the multi-channel flat valve assembly 110 is effectively withdrawn relative to the valve holder implement 174 so as to remain installed within the side edge portion 180 of the inflatable dunnage or cargo air bag assembly 164-1. The multi-channel flat valve assembly 110 can then be fixed within the side edge portion 180 of the inflatable dunnage or cargo air bag assembly 164-1 by means of suitable heat-sealing techniques, as has been previously described, and the operative cycle can be repeated with respect to subsequent inflatable dunnage or cargo air bag assemblies.

Thus, it may be seen that in accordance with the principles and teachings of the present invention, there has been provided a new and improved multi-channel flat valve assembly which has an enhanced width dimension, a relatively small length dimension, and a plurality of flow-through fluid channels defined therein which permit a substantially large volume of air to flow therethrough while effectively preventing the propagation of forces which would otherwise tend to inadvertently open the valve and cause undesirable deflation of the inflatable bladder. Apparatus, and a method, for installing the multi-channel flat valve assembly within a side edge portion of the inflatable dunnage or cargo air bag is also disclosed.

Obviously, many variations and modifications of the present invention are possible in light of the above teachings. It is therefore to be understood that within the scope of the appended claims, the present invention may be practiced otherwise than as specifically described herein.

The invention claimed is:

1. A multi-channel flat valve assembly for use within an inflatable structure in order to control the inflation and deflation of a single internal space defined within the inflatable structure, comprising:

a pair of members disposed in surface-to-surface contact with respect to each other, wherein each one of said pair of members has a predetermined lateral width dimension, a predetermined longitudinal length dimension, oppositely disposed side edge portions, and oppositely disposed end edge portions;

means for sealing together said oppositely disposed side edge portions of said pair of members such that said multi-channel flat valve assembly has an open upstream entrance end portion which is adapted to be accessible externally of the inflatable structure for receiving a supply of a pressurized fluid to be conducted into the inflatable structure, and an open downstream exit end portion which is adapted to be disposed within the inflatable structure so as to conduct the pressurized fluid into the inflatable structure; and a plurality of longitudinally extending, laterally spaced, fluidically separated fluid channels, connected together along their longitudinal extents, defined between said pair of members disposed in surface-to-surface contact with respect to each other, wherein said plurality of longitudinally extending, laterally spaced, fluidically separated fluid channels have downstream open end portions which are all adapted to fluidically communicate together with the single internal space defined within the inflatable structure so as to enable the inflation of the inflatable structure, and upstream open end portions which are located downstream from said open upstream entrance end portion of said multi-channel flat valve assembly so as to prevent the propagation of forces, attendant the inflation of the inflatable structure and tending to undesirably open said multi-channel flat valve assembly, toward said open downstream exit end portion of said multi-channel flat valve assembly whereby said multi-channel flat valve assembly will not be undesirably opened once the inflatable structure has been inflated.

2. The multi-channel flat valve assembly as set forth in claim 1, wherein:
said pair of members disposed in surface-to-surface. contact with respect to each other comprise a pair of thermo-plastic sheet members.

3. The multi-channel flat valve assembly as set forth in claim 2, wherein:
said oppositely disposed side edge portions of said pair of thermoplastic sheet members are heat-sealed with respect to each other so as to close said oppositely disposed side edge portions of said pair of thermoplastic sheet members; and
said pair of thermoplastic sheet members are heat-sealed with respect to each other along at least one longitudinally extending location interposed between said oppositely disposed heat-sealed side edge portions such that said plurality of longitudinally extending, laterally spaced, fluidically separated fluid channels comprise at least one pair of longitudinally extending, laterally spaced, fluidically separated fluid channels.

4. The multi-channel flat valve assembly as set forth in claim 3, wherein:
said multi-channel flat valve assembly has a predetermined length dimension and comprises a first upstream section which is adapted to be disposed externally of the inflatable structure and which has said open entrance end portion defined therein for accommodating a source of pressurized fluid for inflating the inflatable structure, and a second downstream section which is adapted to be disposed internally within the inflatable structure and which has said open exit end portion defined therein so as to permit pressurized fluid, flowing through said at least one pair of longitudinally extending, laterally spaced, fluidically separated fluid channels, to inflate the inflatable structure.

5. The multi-channel flat valve assembly as set forth in claim 4, wherein:
said at least one longitudinally extending heat-sealed location, interposed between said oppositely disposed heat-sealed side edge portions of said pair of thermoplastic sheet members and defining said at least one pair of longitudinally extending, laterally spaced, fluidically separated fluid channels, extends upstream from said open exit end portion of said multi-channel flat valve assembly to a location downstream from said open entrance end portion of said multi-channel flat valve assembly, which is adapted to be disposed externally of the inflatable structure, such that when said forces, attendant the inflation of the inflatable structure, tend to separate said pair of thermoplastic sheet members from each other and thereby undesirably open said multi-channel flat valve assembly, said at least one longitudinally extending heat-sealed location, interposed between said oppositely disposed heat-sealed side edge portions of said pair of thermoplastic sheet members and defining said at least one pair of longitudinally extending, laterally spaced, fluidically separated fluid channels, will prevent said propagation of said forces so as to prevent said separation of said pair of thermoplastic sheet members from each other and said undesirable opening of said multi-channel flat valve assembly.

6. An inflatable assembly, comprising:
an inflatable structure; and
a multi-channel flat valve assembly disposed within said inflatable structure in order to control the inflation and deflation of a single internal space defined within said inflatable structure;
said multi-channel flat valve assembly comprising a pair of members disposed in surface-to-surface contact with respect to each other, wherein each one of said pair of members has a predetermined lateral width dimension, a predetermined longitudinal length dimension, oppositely disposed side edge portions, and oppositely disposed end edge portions; means for sealing together said oppositely disposed side edge portions of said pair of members such that said multi-channel flat valve assembly has an open upstream entrance end portion which is adapted to be accessible externally of said inflatable structure for receiving a supply of a pressurized fluid to be conducted into said inflatable structure, and an open downstream exit end portion which is adapted to be disposed within said inflatable structure so as to conduct the pressurized fluid into said inflatable structure;

and a plurality of longitudinally extending, laterally spaced, fluidically separated fluid channels, connected together along their longitudinal extents, defined between said pair of members disposed in surface-to-surface contact with respect to each other, wherein said plurality of longitudinally extending, laterally spaced, fluidically separated fluid channels have downstream open end portions which are all adapted to fluidically communicate together with said single internal space defined within said inflatable structure so as to enable the inflation of said inflatable structure, and upstream open end portions which are located downstream from said open upstream entrance end portion of said multi-channel flat valve assembly so as to prevent the propagation of forces, attendant the inflation of said inflatable structure and tending to undesirably open said multi-channel flat valve assembly, toward said open downstream exit end portion of said multi-channel flat valve assembly whereby said multi-channel flat valve assembly will not be undesirably opened once said inflatable structure has been inflated.

7. The inflatable assembly as set forth in claim 6, wherein:
said pair of members disposed in surface-to-surface contact with respect to each other comprise a pair of thermo-plastic sheet members.

8. The inflatable assembly as set forth in claim 7, wherein:
said oppositely disposed side edge portions of said pair of thermoplastic sheet members are heat-sealed with respect to each other so as to close said oppositely disposed side edge portions of said pair of thermoplastic sheet members; and
said pair of thermoplastic sheet members are heat-sealed with respect to each other along at least one longitudinally extending location interposed between said oppositely disposed heat-sealed side edge portions such that said plurality of longitudinally extending, laterally spaced, fluidically separated fluid channels comprise at least one pair of longitudinally extending, laterally spaced, fluidically separated fluid channels.

9. The inflatable assembly as set forth in claim 8, wherein:
said multi-channel flat valve assembly has a predetermined length dimension and comprises a first upstream section which is disposed externally of said inflatable structure and which has said open entrance end portion defined therein for accommodating a source of pressurized fluid for inflating said inflatable structure, and a second downstream section which is disposed internally within said inflatable structure and which has said open exit end portion defined therein so as to permit pressurized fluid, flowing through said at least one pair of longitudinally extending, laterally spaced, fluidically separated fluid channels, to inflate said inflatable structure.

10. The inflatable assembly as set forth in claim 9, wherein:
said at least one longitudinally extending heat-sealed location, interposed between said oppositely disposed heat-sealed side edge portions of said pair of thermoplastic sheet members and defining said at least one pair of longitudinally extending, laterally spaced, fluidically separated fluid channels, extends upstream from said open exit end portion of said multi-channel flat valve assembly to a location downstream from said open entrance end portion of said multi-channel flat valve assembly, which is disposed externally of said inflatable structure, such that when said forces, attendant the inflation of said inflatable structure, tend to separate said pair of thermoplastic sheet members from each other and thereby undesirably open said multi-channel flat valve assembly, said at least one longitudinally extending heat-sealed location, interposed between said oppositely disposed heat-sealed side edge portions of said pair of thermo-plastic sheet members and defining said at least one pair of longitudinally extending, laterally spaced, fluidically separated fluid channels, will prevent said propagation of said forces so as to prevent said separation of said pair of thermoplastic sheet members from each other and said undesirable opening of said multi-channel flat valve assembly.

11. The inflatable assembly as set forth in claim 6, wherein:
said multi-channel flat valve assembly is disposed within a side edge portion of said inflatable structure adjacent to a corner region of said inflatable structure.

12. The inflatable assembly as set forth in claim 11, wherein:
said multi-channel flat valve assembly has a longitudinal axis which is disposed substantially perpendicular to said side edge portion of said inflatable structure.

13. The inflatable assembly as set forth in claim 11, wherein:
said multi-channel flat valve assembly has a longitudinal axis which is disposed at a predetermined angular orientation with respect to said side edge portion of said inflatable structure.

14. The multi-channel flat valve assembly as set forth in claim 3, wherein:
said pair of thermoplastic sheet members, heat-sealed with respect to each other along said at least one longitudinally extending location interposed between said oppositely disposed heat-sealed side edge portions, are heat-sealed along two longitudinally extending locations interposed between said oppositely disposed heat-sealed side edge portions such that said plurality of longitudinally extending, laterally spaced, fluidically separated fluid channels comprise three laterally spaced, longitudinally extending, laterally spaced, fluidically separated fluid channels.

15. The multi-channel flat valve assembly as set forth in claim 14, wherein:
said three longitudinally extending, laterally spaced, fluidically separated fluid channels comprise a first longitudinally extending fluid channel defined between a first heat-sealed side edge portion and a first one of said two longitudinally extending heat-sealed locations interposed between said oppositely disposed heat-sealed side edge portions, a second longitudinally extending fluid channel defined between said two longitudinally extending heat-sealed locations interposed between said oppositely disposed heat-sealed side edge portions, and a third longitudinally extending fluid channel defined between a second one of said two longitudinally extending heat-sealed locations interposed between said oppositely disposed heat-sealed side edge portions and a second heat-sealed side edge portion.

16. The inflatable assembly as set forth in claim 13, wherein:
said longitudinal axis of said multi-channel flat valve assembly is disposed at an angular orientation of 450° with respect to said side edge portion of said inflatable structure.

17. The inflatable assembly as set forth in claim 8, wherein:
said pair of thermoplastic sheet members, heat-sealed with respect to each other along said at least one longitudinally extending location interposed between said oppositely disposed heat-sealed side edge portions, are heat-sealed along two longitudinally extending locations interposed between said oppositely disposed heat-sealed side edge portions such that said plurality of longitudinally extending, laterally spaced, fluidically separated fluid channels comprise three longitudinally extending, laterally spaced, fluidically separated fluid channels.

18. The multi-channel flat valve assembly as set forth in claim 17, wherein:

said three longitudinally extending, laterally spaced, fluidically separated fluid channels comprise a first longitudinally extending fluid channel defined between a first heat-sealed side edge portion and a first one of said two longitudinally extending heat-sealed locations interposed between said oppositely disposed heat-sealed side edge portions, a second longitudinally extending fluid channel defined between said two longitudinally extending heat-sealed locations interposed between said oppositely disposed heat-sealed side edge portions, and a third longitudinally extending fluid channel defined between a second one of said two longitudinally extending heat-sealed locations interposed between said oppositely disposed heat-sealed side edge portions and a second heat-sealed side edge portion.

\* \* \* \* \*